United States Patent
Goffredi et al.

(10) Patent No.: US 9,493,594 B2
(45) Date of Patent: Nov. 15, 2016

(54) CATIONIC POLYMERIZATION PROCESS FOR THE SYNTHESIS OF NANO-STRUCTURED POLYMERS CONTAINING GRAPHENE

(71) Applicant: Versalis SPA, San Donato Milanese (IT)

(72) Inventors: Gino Goffredi, Mantova (IT); Aldo Longo, Mantova (IT);
(Continued)

(73) Assignee: Versalis S.P.A. (IT)

( * ) Notice: Subject to any disclaimer, the term of this patent is extended or adjusted under 35 U.S.C. 154(b) by 0 days.

(21) Appl. No.: 14/892,787

(22) PCT Filed: May 20, 2014

(86) PCT No.: PCT/EP2014/060291
§ 371 (c)(1),
(2) Date: Nov. 20, 2015

(87) PCT Pub. No.: WO2014/187796
PCT Pub. Date: Nov. 27, 2014

(65) Prior Publication Data
US 2016/0152748 A1     Jun. 2, 2016

(30) Foreign Application Priority Data
May 22, 2013    (IT) .............................. MI2013A0834

(51) Int. Cl.
C01B 31/04     (2006.01)
C08F 212/08    (2006.01)
(Continued)

(52) U.S. Cl.
CPC ............ *C08F 212/08* (2013.01); *C01B 31/043* (2013.01); *C01B 31/0476* (2013.01); *B82Y 30/00* (2013.01);
(Continued)

(58) Field of Classification Search
CPC .................................................. C01B 31/0476
See application file for complete search history.

(56) References Cited

U.S. PATENT DOCUMENTS

| | | | |
|---|---|---|---|
| 2,798,878 | A | 7/1957 | Hummers et al. |
| 2011/0189452 | A1 | 8/2011 | Lettow et al. |

(Continued)

FOREIGN PATENT DOCUMENTS

| | | |
|---|---|---|
| CN | 102391632 | 3/2012 |
| WO | WO2010042912 | 4/2010 |
| WO | WO2010141348 | 12/2010 |

OTHER PUBLICATIONS

International Search Report and Written Opinion dated Jun. 23, 2014 for PCT/EP2014/060291.
(Continued)

*Primary Examiner* — Vu A Nguyen
(74) *Attorney, Agent, or Firm* — Abel Law Group, LLP

(57) ABSTRACT

A cationic polymerization process for the synthesis of nano-structured polymers containing graphene which comprises reacting graphite oxide dispersed in a solvent by means of ultrasounds, with at least one vinyl monomer and at least one vinyl aromatic monomer, in the presence of at least one strong inorganic acid and suitable for activating a cationic polymerization, wherein: —said graphite oxide contains from 5% to 60% by weight of bound oxygen, —said vinyl monomer contains at least one carboxylic group wherein the ratio between oxygen bound to the oxide and carboxylic groups ranges from 1:10 to 10:1 in moles per mole, and—the
(Continued)

ratio between said vinyl aromatic monomer and the sum of the quantity of graphite oxide and vinyl monomer containing carboxylic groups ranges from 50% to 99% by weight.

18 Claims, 5 Drawing Sheets

(72) Inventors: Olga Valentino, Mantova (IT); Riccardo Felisari, San Giorgio di Mantova (IT); Alessandro Casalini, Mantova (IT)

(51) Int. Cl.
*B82Y 30/00* (2011.01)
*B82Y 40/00* (2011.01)

(52) U.S. Cl.
CPC ............ *B82Y 40/00* (2013.01); *C01B 2204/04* (2013.01); *C01B 2204/30* (2013.01); *C01B 2204/32* (2013.01)

(56) References Cited

U.S. PATENT DOCUMENTS

| | | | |
|---|---|---|---|
| 2011/0281035 A1 | 11/2011 | Rafailovich et al. | |
| 2012/0068122 A1* | 3/2012 | Kranbuehl | B82Y 30/00 252/503 |
| 2012/0164433 A1* | 6/2012 | Advincula | B82Y 30/00 428/327 |

OTHER PUBLICATIONS

Kim, et al. "Graphene/Polymer Nanocomposites." Macromolecules, American Chemical Society, Washington DC, vol. 43, No. 16, Aug. 24, 2010, 6515-6530.
Tapas, et al. "Characterization and properties of emulsion polymerized poly(methyl metacrylate)/graphene nanocomposites." Composites Part A: Applied Science and Manufacturing, Elsevier Science Publishers, B.V., Amesterdam, vol. 42, No. 11., Aug. 19, 2011, 1856-1861.
Zheng et al., J Appl. Polym Sci 2004, 91, 2781-2788.
Reddy et al., Nanotechnology 2006, 17, 864-870.
Bouchvalov et al., Phys. Rev. B 2008, 77, 035427/1-6.
Andres et al., Phys. Rev. B 2008, 77, 045403/1-5.
Zhang et al., Nature 2005, 438, 201-204.
Geim, Novoselov, S. Nat. Matre. 2007, 6, 183-191.
Novoselov et al., Science 2004, 306, 666.
Blakslee et al., J. Appl. Phys. 1970, 41, 3373.
Schniepp et al., J. Phys. Chem. B 2006, 110, 8535-8539.
Tung et al., Nature Nanotechnology 2008, 25-29.
Park et al., Chem Mater. 2008, 20, 6592-6594.
Kuilla et al., Progress in Polymer Science 2010, 35, 1350-1375.
Berger et al., J. Phys. Chem. B 2004, 108, 19912-19916.
Berger et al., Science 2006, 312, 1191-1196.
Aizawa et al., Phys. Rev. Lett. 1990, 64, 768-771.
Stankovich et al., Carbon 2007, 45, 1558-1565.
Stankovich et al., Nature 2006, 442, 282-286.
Wang et al., J. Phys. Chem. C 2008, 112, 8192-8195.
Si, Samulski, Nano Lett. 2008, 8, 1679-1682.
Gao et al., Chem Mater 2010, 22:2213-2218.
Zhang et al., Chem. Commun. 2010, 46, 1112-1114.
Staudenmaier, Ber. Stsch. Chem. Ges. 1898, 31, 1481.
Hummers et al., J. Am. Chem. Soc.1958, 80, 1339.
Weng et al., J Polym Sci Part B Polym Phys 2004, 42, 2842-2856.
Ganguli et al., Carbon 2008; 46:806-17.
Wang et al., Appl Polym Sci 2006, 100, 1427-31.
Kalaitzidou et al., Compos Part A 2007, 38, 1675-1682.
Kim et al., Compos Part A 2010, 41, 581-587.
Kim et al., Polym Compos 2009, 31, 755-761.
Zou et al., J Polym Sci Part B Polym Phys 2002, 40, 954-963.
Xiao et al., Polymer 2002, 43, 2245-2248.
Kim et al., Carbon 2007, 45, 1578-1582.
Xiao et al., Polymer 2001, 42, 4813-4816.
Chen et al., Polymer 2003, 44, 1781-1784.
Du et al., Eur Polym J. 2004, 40, 1489-1493.
Cho et al., Macromol Mater Eng 2005, 290, 179-187.
Mu et al., Thermochim Acta 2007, 462, 70-75.
Dikin et al., Nature 2007, 448:457-60.
Vickery et al., Adv Mater 2009; 21:2180-4.
McAllister et al., Chem Mater 2007, 19:4396-404.
Potts J.R. et al., Polymer 2011; 52: 5-25.
Cerezo et al., Macromol. Mater. 2007, 292, 155-168.

* cited by examiner

CATIONIC POLYMERIZATION PROCESS FOR THE SYNTHESIS OF NANO-STRUCTURED POLYMERS CONTAINING GRAPHENE

The present invention relates to a process for the synthesis of nano-structured polymers containing graphene.

In the present patent application, all the operative conditions mentioned in the text should be considered as being preferred conditions, even if not explicitly declared.

For the purposes of the present document, the term "comprise" or "include" also comprises the terms "consisting in" or "essentially consisting of".

For the purposes of the present document, the definitions of the ranges always include the extremes unless otherwise specified.

Graphene consists of a two-dimensional honeycomb structure, composed of $sp^2$ hybridized carbon atoms (about 38 per $nm^3$), bound to each other according to a lattice structure with hexagonal rings, having a length of the C—C bond approximately equal to 0.142 nm, without defects due to the presence of heteroatoms (Reddy et al., Nanotechnology 2006, 17, 864-870; Bouchvalov et al., Phys. Rev. B 2008, 77, 035427/1-6; Andres et al., Phys. Rev. B 2008, 77, 045403/1-5).

The graphene sheets can be composed of a mixture of single graphite sheets totally exfoliated and graphite sheets (two or more) partially exfoliated.

The single graphene sheet has a thickness of about 1 nm (Van Der Waals thickness equal to 0.34 nm), a surface area preferably ranging from 100 to 2630 $m^2/g$ (maximum theoretical surface area), a height/width ratio (aspect ratio) normally ranging from 100 to 100,000 and a bulk density ranging from 0.1 to 200 $kg/m^3$ (WO 2010/042912, US 2011/0189452).

Graphene has a high electron mobility index, equal to 15,000 $cm^2\ V^{-1}\ s^{-1}$, an electron resistivity equal to $1\times10^{-2}$ $\Omega m$ (the lowest registered so far in a material), an electric and thermal conductivity (at room temperature) equal to 6 S $cm^{-1}$ and 5,020 $W\ m^{-1}\ K^{-1}$, respectively, (ten times higher than those of silver).

The two-dimensional structure of graphene and the fact that the movement of the electrons can only take place in two directions, guarantees extraordinary mechanical and electrical properties for the material which are higher than those of solid materials having a three-dimensional structure and also those of gases of two-dimensional electrons (Kelly, Applied Science 1981, Essex, England; Blakslee et al., J. Appl. Phys. 1970, 41, 3373; Novoselov et al., Science 2004, 306, 666; Geim, Novoselov, S. Nat. Matre. 2007, 6, 183-191; Pisula, Mullen, Chem. Rev., 2007, 107, 718-747; Zhang et al., Nature 2005, 438, 201-204).

Graphenes can, for example, induce an extraordinary effect on the gas barrier properties of the materials and can increase the percolation effect even at low concentrations (WO 2010/141348, Schniepp et al., J. Phys. Chem. B 2006, 110, 8535-8539).

Their mechanical properties are also exceptional: they have a tensile strength equal to 400,000 MPa the highest ever measured in a material (US 2011/0281035, WO 2010/141348).

Graphene in the form of a single-layer material can only be obtained through difficult, laborious processes with low yields (Tung et al., Nature Nanotechnology 2008, 25-29; Park et al., Chem Mater. 2008, 20, 6592-6594; Kuilla et al., Progress in Polymer Science 2010, 35, 1350-1375; Muller et al., Nat. Nanotechnol. 2007, 3, 101-105).

Some of these known processes are:
high-temperature reduction of silicon carbide (Berger et al., J. Phys. Chem. B 2004, 108, 19912-19916; Berger et al., Science 2006, 312, 1191-1196);
micromechanical exfoliation of graphite, also known as the "Scotch tape" or peel off method (Novoselov et al., Science 2004, 306, 666-669; Lu et al., Nanotechnology 1990, 10, 269-272);
deposition of chemical vapours and epitaxial growth (Berger et al., Science 2006, 312, 1191-1196;) such as the decomposition of ethylene on a nickel surface (Eizemberg et al., Surf. Sci. 1979, 82, 228-236; Aizawa et al., Phys. Rev. Lett. 1990, 64, 768-771);
chemical reduction of graphite oxide exfoliated in solution (Li et al., Nat. Nanotechnol. 2007, 3, 101-105; Berger et al., Science 2006, 312, 1191-1196).

The chemical reduction of graphite oxide can be effected with:
hydrazine (Stankovich et al., Carbon 2007, 45, 1558-1565);
dimethyl-hydrazine (Stankovich et al., Nature 2006, 442, 282-286);
hydroquinone (Wang et al., J. Phys. Chem. C 2008, 112, 8192-8195);
sodium-boron hydride (Si, Samulski, Nano Lett. 2008, 8, 1679-1682);
tryptophan (Gao et al., Chem Mater 2010, 22:2213-2218);
ascorbic acid (Zhang et al., Chem. Commun. 2010, 46, 1112-1114).

Graphite oxide can be obtained by the oxidation of expanded graphite in an acid environment with sulfuric and/or nitric acid, using, as oxidants:
potassium chloride (Brodie, Ann. Chim. Phys. 1860, 59, 446; Staudenmaier, Ber. Stsch. Chem. Ges. 1898, 31, 1481);
potassium permanganate (Hummers et al., J. Am. Chem. Soc. 1958, 80, 1339; U.S. Pat. No. 2,798,878);
permanganate of alkaline earth metals (WO 2010/042912).

The study of the methods used for the dispersion of graphene in a polymeric matrix and the production of polymer/graphene nano-composites (nano-structured polymers) represents an area of considerable interest as these materials have physico-chemical and mechanical properties which cannot be obtained from the original polymers. The enhancement of these properties can be obtained using extremely low concentrations of nano-composite and is directly proportional to the dispersion rate of the same nano-composite in the polymeric matrix (Kuilla et al., Progress in polymer Science 2010, 35, 1350-1375).

Various studies have been carried out relating to the preparation of nano-structured polymers having different polymeric matrixes, such as, for example:
epoxy polymers (Ganguli et al., Carbon 2008; 46:806-17); PMMA (Wang et al., Appl Polym Sci 2006, 100, 1427-31);
polypropylene (Kalaitzidou et al., Compos Part A 2007, 38, 1675-1682); LLDPE and HDPE (Kim et al., Compos Part A 2010, 41, 581-587; Kim et al., Polym Compos 2009, 31, 755-761.);
polystyrene (Zheng et al., J Appl. Polym Sci 2004, 91, 2781-2788; Zou et al., J Polym Sci Part B Polym Phys 2002, 40, 954-963; Wanga et al., Polymer 2004, 45, 3987-3995; Xiao et al., Polymer 2002, 43, 2245-2248; Kim et al., Carbon 2007, 45, 1578-1582; Xiao et al., Polymer 2001, 42, 4813-4816; Chen et al., Polymer 2003, 44, 1781-1784); Nylon (Weng et al., J Polym Sci Part B Polym Phys 2004, 42, 2842-2856);
polyaniline (Du et al., Eur Polym J. 2004, 40, 1489-1493); polyimides (Cho et al., Macromol Mater Eng 2005, 290, 179-187); silicon rubbers (Mu et al., Thermochim Acta 2007, 462, 70-75).

Pure graphene (pristine graphene) is not compatible with organic polymers and cannot form homogeneous compounds with the same, contrary to graphite oxide (Dikin et al., Nature 2007, 448:457-60; Vickery et al., Adv Mater 2009; 21:2180-4; McAllister et al., Chem Mater 2007, 19:4396-404; Bourlinos et al., Chem Mater 2003; 19:6050-5; Stankovich et al., Carbon 2007; 45:1558-65).

One of the ways of uniformly dispersing graphene-based nanoplates in a polymeric matrix can be to form covalent bonds between polymeric chains and nanoplates. Graphite oxide contains reactive functional groups such as hydroxyls, epoxides, carbonyls, carboxyls, and is capable of reacting with both monomers and polymers containing functional groups such as, for example, carboxyls and derivatives thereof, amines, isocyanates, with two different techniques known as "grafting from" and "grafting to" as described in: Potts J. R. et al., Polymer 2011; 52: 5-25.

An example of the "grafting to" method can be found in Cerezo et al., Macromol. Mater. 2007, 292, 155-168, which describes the functionalization of polypropylene with maleic anhydride and the subsequent grafting of graphite oxide exfoliated on the functionalized polymer thanks to the reaction of maleic anhydride with the hydroxyl, carbonyl and carboxyl groups of the oxide. Once the graphite oxide has been uniformly dispersed in the polymeric matrix, the reduction to graphene can be effected, avoiding the packing of various layers of the nano-composite.

The Applicant proposes a particularly effective and economical process for the synthesis of nano-structured polymers, based on graphene, which allows a vinyl aromatic polymer to be chemically bound to graphite oxide so as to obtain a dispersion on a nanometric level.

With the cationic polymerization process, object of the present invention, a particularly effective dispersion was obtained on a nanometric level, contrary to what occurs in the state of the art in which the dispersions obtained always have a part of marked crystallinity, as can be observed through X-ray analysis.

The object of the present patent application is therefore a cationic polymerization process for the synthesis of nano-structured polymers containing graphene, which comprises reacting graphite oxide, dispersed in a solvent, by means of ultrasounds, with at least one vinyl monomer and at least one vinyl aromatic monomer, in the presence of at least one strong inorganic acid and suitable for activating a cationic polymerization, wherein:
  said graphite oxide contains from 5 to 60% by weight of bound oxygen,
  said vinyl monomer contains at least one carboxylic group wherein the ratio between the oxygen bound to the oxide and the carboxyl groups ranges from 1:10 to 10:1 in moles per mole, and
  the ratio between said vinyl aromatic monomer and the sum of the quantity of graphite oxide and vinyl monomer containing carboxyl groups ranges from 50% to 99% by weight.

Unlike other known processes, said process allows the complete exfoliation of graphite into graphene sheets which do not form agglomerates.

The complete exfoliation and absence of agglomerates allows nano-composites containing graphene to be obtained, uniformly distributed with the lowest consumption of starting materials and without onerous separation phases of the residual agglomerates.

Further objectives and advantages of the present invention will appear more evident from the following description and enclosed figures, which are provided for purely illustrative and non-limiting purposes.

DETAILED DESCRIPTION

Figure 1:
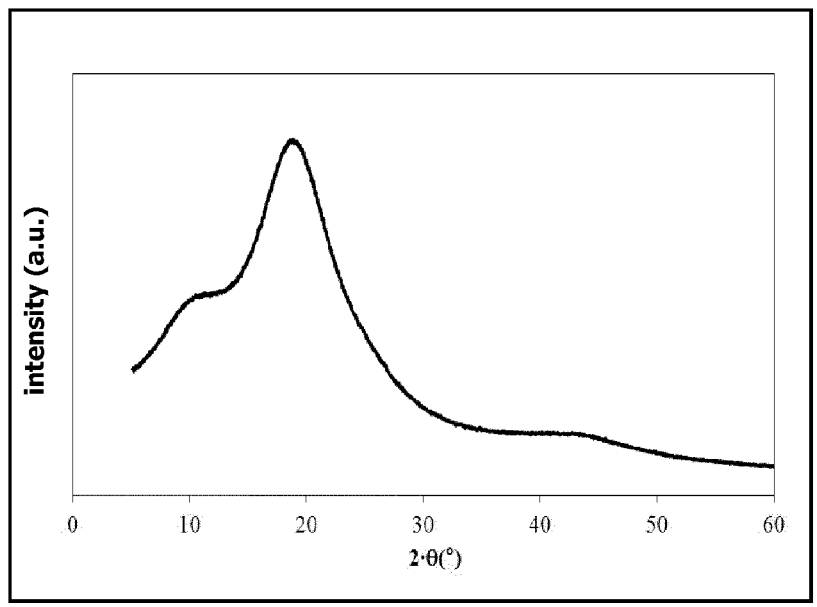
FIG. 1 is the XRD diffractogram of the polymer obtained with the method described in Example 10, wherein the ordinate axis is the intensity (arbitrary unit or a.u.).

The present invention relates to a cationic polymerization process for the synthesis of nano-structured polymers containing graphene, which comprises reacting graphite oxide, dispersed in a solvent by means of ultrasounds, with at least one vinyl monomer and at least one vinyl aromatic monomer, in the presence of at least one strong inorganic acid and suitable for activating a cationic polymerization, wherein:
  said graphite oxide contains from 1% to 60% by weight of bound oxygen,
  said vinyl monomer contains at least one carboxylic group wherein the ratio between oxygen bound to the oxide and carboxylic groups ranges from 1:10 to 10:1 in moles per mole, and
  the ratio between said vinyl aromatic monomer and the sum of the quantity of graphite oxide and vinyl monomer containing carboxylic groups ranges from 50% to 99% by weight.

According to a preferred embodiment of the present invention, the graphite oxide is dispersed in a solvent, by means of ultrasounds, together with at least one inorganic acid and at least one vinyl monomer containing carboxyl groups. Said dispersion is then concentrated by evaporating the whole or part of the solvent, especially if the inorganic acid was added in aqueous solution during the reaction.

At least one vinyl aromatic monomer is subsequently added and the polymerization takes place cationically.

According to a further preferred embodiment of the present invention, the graphite oxide is dispersed in a solvent by means of ultrasounds, at least one inorganic acid is then added. Said dispersion is subsequently concentrated by evaporating the whole or part of the solvent, especially if the inorganic acid was added in aqueous solution.

After concentration, the vinyl monomer containing carboxyl groups and the vinyl aromatic monomer are subsequently added so that the polymerization takes place cationically.

The graphite oxide contains from 5% to 60% by weight of bound oxygen, preferably from 10% to 60%, more preferably from 15% to 50% by weight, even more preferably from 20% to 30% by weight. Said graphite oxide can be prepared using one of the methods described in the above-mentioned known art, preferably by oxidation of the previously expanded graphite, using a mixture of sulphuric acid and nitric acid and with potassium permanganate.

The solvent used for dispersing the graphite oxide with ultrasounds can be selected from common solvents used in esterification reactions of carboxylic acids, or derivatives thereof, with alcohols. Among these, tetrahydrofuran, dioxane, dimethyl sulfoxides, preferably tetrahydrofuran, can be mentioned.

In the cationic polymerization of vinyl aromatic monomers, an aromatic solvent such as, for example, ethyl benzene, toluene, xylene, propyl benzene can be conveniently used.

In this case, it may be convenient to use a polar solvent in the dispersion phase of the graphite oxide and consequently in the evaporation phase of said solvent, the partial evaporation of the water contained in the acid can therefore be contemporaneously obtained, so as to obtain an acid/water ratio which is such that there is no separation between the aqueous phase and the organic phase. As the cationic polymerization reaction is particularly rapid, it is common practice to use a solvent which acts as a thermal flywheel and can remove the reaction heat by evaporation, in order to prevent losing control of the reaction.

Strong inorganic acids which can be used in the present invention can be sulfuric acid, nitric acid, hydrogen halide acid, ortho-phosphoric acid, preferably sulfuric acid. The acid can be advantageously added in aqueous solution, in one or more fractions depending on the process used and in any case in such a quantity and ratio with the water as to activate the cationic polymerization following the addition of the vinyl aromatic monomer. The molar ratio between inorganic acid and water when the vinyl aromatic monomer is added, preferably ranges from 50:1 to 1000:1. It is essential that there be no excess of water so as to cause phase separation, as the cationic polymerization may not be triggered.

The functional groups containing oxygen possibly remaining in the nano-structured polymer containing exfoliated graphene, obtained with the process described and claimed, can be subsequently removed by reduction with any method known in the state of the art.

The dispersion with ultrasounds can be effected using known equipment and of common commercial use, suitable for the dispersion of solids and liquids in liquids.

The dispersion with ultrasounds takes place according to the mechanism described hereunder.

The effect on the dispersion and/or exfoliation of graphite materials in suitable solvents caused by the ultrasounds is not due to the transmission or absorption of the ultrasound wave, but rather to the onset of the cavitation phenomenon which causes violent thermal effects (T~5,000 K), physical effects (P~2,000 atm) and in some cases, even chemical effects (for example generation of radicals).

The term cavitation refers to the formation and almost immediate implosion of cavities (or bubbles) in liquids.

When the ultrasounds pass through the medium, in fact, under the action of the sound pressure, the average distance between the molecules changes as these molecules oscillate around their equilibrium position. When the negative pressure caused by an ultrasound wave passing through the liquid is sufficiently high, the distance between the molecules of the liquid exceeds the minimum molecular distance required for keeping the liquid intact. The latter consequently breaks down, creating voids: so-called cavitation bubbles. These continue to grow until the negative pressure reaches its maximum value. Subsequently, during the compression cycle, the bubbles contract and some of them collapse. The implosion of a bubble is so rapid as to be practically adiabatic and therefore, at the end of collapse, it is calculated that the gas contained in the bubble can reach temperatures close to 5,000 K and that, inside the bubble itself, pressures up to 2,000 atm can be reached. The enormous amount of energy released invades both the surface and the interstices of the solid material, favouring the exfoliation of the graphite layers and its disintegration into smaller particles and more easily dispersible in the solvent.

The ultrasound bath used for the test is filled with demineralized water and the container containing the graphite dispersion in a suitable solvent is immersed in its interior. The ultrasound wave is therefore compelled to pass through the transmission liquid contained in the tank (water) and the wall of the container containing the sample.

The treatment temperature can range from −50° C. to 100° C., more preferably from 0 to 80° C., even more preferably from 20 to 70° C.

The ultrasound frequency can range from 20 to 1,000 Mhz, preferably from 20 to 200 khz. It is normally preferable to use fixed frequency ultrasound generators, but there is no particular impediment for using various transducers, operating at different frequencies, or generators at variable frequencies.

The ultrasound power can range from 10 W to 2,000 W per liter, more preferably from 30 W to 1,000 W per liter.

The application time of the ultrasound treatment can vary from a minute to a month, according to the intensity of the ultrasound used. Preferably, the application time ranges from 10 minutes to 1 day.

The vinyl aromatic monomers can be selected from those corresponding to the following general formula (I):

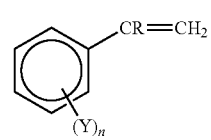

wherein R is hydrogen or a methyl group, n is zero or an integer ranging from 1 to 5, and Y is a halogen, preferably selected from chlorine or bromine, or a saturated or unsaturated alkyl radical or an alkoxyl radical having from 1 to 4 carbon atoms.

Examples of vinyl aromatic monomers having general formula (I), are: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, divinylbenzene. Preferred vinyl aromatic monomers are styrene, α-methylstyrene and divinylbenzene.

The vinyl monomers containing carboxyl groups can be selected from derivatives of acrylic and methacrylic acids such as esters, anhydrides and chlorides.

Examples of vinyl monomers are: maleic anhydride, maleic acid chloride, maleic acid esters deriving from alcohols having from 1 to 8 carbon atoms, acrylic acid, acrylic acid chloride, acrylic acid anhydrides, acrylic acid esters deriving from alcohols having from 1 to 8 carbon atoms, methacrylic acid, methacrylic acid chloride, methacrylic acid anhydrides, methacrylic acid esters deriving from alcohols having from 1 to 8 carbon atoms.

Preferred vinyl monomers are: maleic anhydride, acrylic acid and methacrylic acid.

Representative but non-limiting examples of the invention, object of the present patent application, are illustrated hereunder.

As comparative examples, tests were carried out which illustrate the following synthesis processes of the nanostructured polymer containing graphene, known in the state of the art:
- a radical polymerization between styrene and maleic anhydride-graphite oxide compound;
- a cationic polymerization of styrene in the presence of ethylbenzene and graphene G2 (supplied by the company Cheap Tubes) after acid adsorption on the latter;
- a radical polymerization between styrene and maleic anhydride in the presence of graphite oxide.

EXAMPLES

A graphite UF 2 supplied by the company Graphit Kropfmühl AG was used for the preparations described in the following examples. In Table 5 are indicated the main characteristics. Graphene G2, supplied by Cheap Tubes, whose characteristics are indicated in Table 6, was also used.

Examples 1 to 3

Preparations of Graphite Oxides (according to Hummers et al., J. Am. Chem. Soc. 1958, 80, 1339).

The graphite UF2 is suspended, in a three-necked flask equipped with a mechanical stirrer, bubble cooler and ice bath, for 30 minutes under vigorous stirring, in a mixture composed of sulfuric acid at 98% and nitric acid at 65%.

Potassium permanganate is added in small portions, ensuring that the temperature does not exceed 10° C. The mixture is left to cool under stirring for 30 minutes, the temperature of the mixture is brought to 40° C. with a water bath and is left under stirring for 30 minutes. Demineralized water is added and the mixture is left under stirring for a further 15 minutes.

The mixture is cooled with an ice bath and the excess permanganate is decomposed by adding distilled water and hydrogen peroxide at 30%, in small portions.

The solid obtained is filtered on a Millipore filter (filter in cellulose nitrate, pore size=5 μm), washed first with hydrochloric acid at 5% until sulphates are no longer released (controlling with a solution of barium chloride at 5%) and then with distilled water until reaching neutrality.

The product is anhydrified by heating in an oven at 80° C. under vacuum.

The graphite oxides indicated in Table 1 are obtained.

TABLE 1

|  | Example 1 | Example 2 | Example 3 |
|---|---|---|---|
| Name of product | GRAFOX 1 | GRAFOX 2 | GRAFOX 3 |
| Graphite (g) | 2.5 | 7.0 | 3.5 |

TABLE 1-continued

|  | Example 1 | Example 2 | Example 3 |
|---|---|---|---|
| Nitric acid (ml) | 5 | 15 | 10 |
| Sulfuric acid (ml) | 25 | 70 | 50 |
| Potassium permanganate (g) | 0.6 | 11.2 | 15.0 |
| Water first addition (ml) | 10 | 200 | 120 |
| Water second addition (ml) | 5 | 100 | 0 |
| Hydrogen peroxide (ml) | 10 | 70 | 150 |
| Oxygen (%) | 10.1 | 28.5 | 50.9 |

Examples 4 to 7

Preparation of the Vinyl Monomer-Graphite Oxide Compounds

The graphite oxide is dispersed in tetrahydrofuran (about 9 hours of treatment) in a 1 liter three-necked flask, equipped with a mechanical stirrer, bubble cooler and thermometer, by immersion in an ultrasound bath at room temperature (using a Branson apparatus model 5200, 40 KHz, 200 Watt), under stirring and a light nitrogen flow.

The vinyl monomer and sulfuric acid 1 M are added under vigorous stirring and at room temperature.

The mixture is brought to boiling point by heating with a thermo-jacket and is left to react for 8 hours.

The mixture is cooled, the solvent evaporated and the product is anhydrified with a nitrogen flow.

The compounds indicated in Table 2 are obtained.

TABLE 2

|  | Example 4 | Example 5 | Example 6 | Example 7 |
|---|---|---|---|---|
| Name of product | MAH-GRAFOX 1 | MAH-GRAFOX 2 | MAH-GRAFOX 3 | METAC-GRAFOX 2 |
| Graphite oxide | GRAFOX 1 1.00 g | GRAFOX 2 1.00 g | GRAFOX 3 1.00 g | GRAFOX 2 1.00 g |
| Tetrahydrofuran (ml) | 1000 | 1000 | 1000 | 1000 |
| Maleic anhydride (g) | 0.62 | 1.75 | 3.12 | / |
| Methacrylic acid (g) | / | / | / | 2.82 |
| Sulfuric acid (ml) | 1 | 1 | 1 | 1 |

Example 8

Adsorption of Sulfuric Acid on the Vinyl Monomer-Graphite Oxide Compound 3.8 g of vinyl monomer-graphite oxide compound are suspended in a 100 ml single-necked flask in 30 ml of tetrahydrofuran and 2 ml of 96% sulphuric acid are added.

The mixture is subjected to mechanical stirring for an hour and the solvent is then removed by heating under vacuum.

Examples 9 to 12

Cationic Polymerization between Styrene and the Vinyl Monomer-Graphite Oxide Compound Impregnated with Sulfuric Acid The compound prepared in Example 8 is suspended in ethylbenzene in a glass jacketed reactor heated with an oil flow, equipped with a mechanical stirrer, thermometer and drip funnel.

The suspension is heated under stirring and when the temperature reaches 35° C., styrene is added very slowly dropwise.

The suspension is heated slowly and the dripping of styrene is continued up to a temperature of 55° C. At this point, maintaining both the temperature of the reactor jacket and the dripping of styrene constant, a temperature rise of the suspension is observed, over a period of about 5 minutes, which reaches 71° C. The temperature is kept constant at the value indicated until the end of the dripping of styrene (about 20 minutes).

At the end of the dripping of styrene, a decrease in temperature to 55° C. is observed, and at this point, the polymer is removed from the reactor.

The solvent and possible residual monomer are removed by heating the polymer under vacuum to 230° C. for 30 minutes.

The polymers indicated in Table 3 are obtained.

Figure 2:
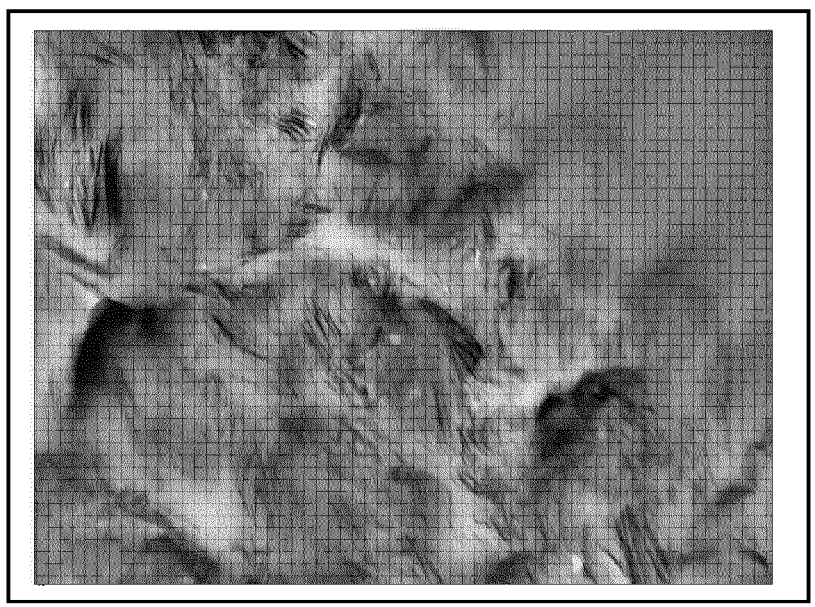
FIG. 2 is the TEM micrography at 200 nm of the polymer obtained with the method described in Example 10.

FIGS. 1 and 2 respectively show the XRD diffractogram and a TEM micrograph at a resolution of 200 nm of the polymer P-SMAH-GRAFOX2-CAT, prepared in Example 10, having a molecular weight ranging from 500 to 1,000 Daltons.

TABLE 3

|  | Example 9 | Example 10 | Example 11 | Example 12 |
|---|---|---|---|---|
| Name of product | P-SMAH-GRAFOX1-CAT | P-SMAH-GRAFOX2-CAT | P-SMAH-GRAFOX3-CAT | P-SMETAC-GRAFOX2-CAT |
| Vinyl monomer - graphite oxide compound | MAH-GRAFOX 1 | MAH-GRAFOX 2 | MAH-GRAFOX 3 | METAC-GRAFOX 2 |
| Ethylbenzene (g) | 120 | 120 | 120 | 120 |
| Styrene (g) | 12 | 34 | 60 | 34 |

Comparative Example 1

Radical Polymerization between Styrene and the Maleic Anhydride-Graphite Oxide Compound 3.5 g of the compound MAH-GRAFOX 2 prepared in Example 5, neutralized with sodium hydroxide, are suspended in 150 g of styrene, in a glass jacketed reactor heated with an oil flow, equipped with a mechanical stirrer, thermometer and drip funnel.

The suspension is heated under stirring to 125° C. and is left at this temperature for 5 hours.

The solvent and possible residual monomer are removed by heating the polymer under vacuum to 230° C. for 30 minutes.

Figure 3:
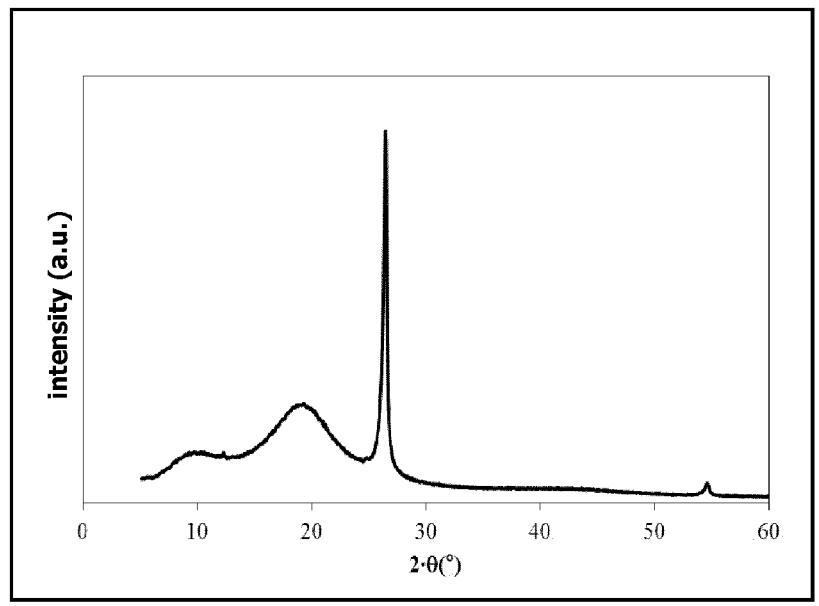
FIG. 3 is the XRD diffractogram of the polymer obtained with the method described in comparative Example 1.
Figure 4:
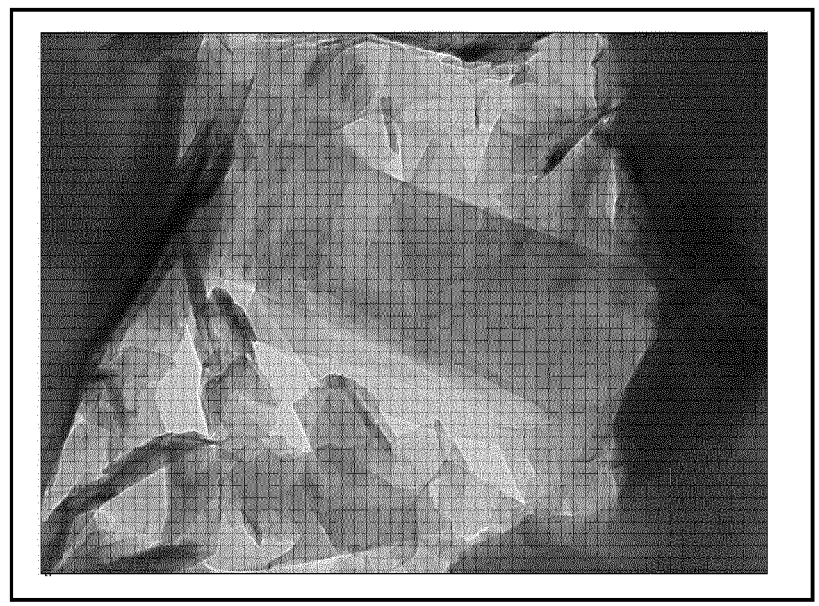
FIG. 4 is the TEM micrography at 500 nm of the polymer obtained with the method described in comparative Example 1.

FIGS. 3 and 4 respectively show the XRD diffractogram and a TEM micrograph at a resolution of 500 nm of the polymer obtained, having a molecular weight of about 600,000 Daltons.

Comparative Example 2

Cationic Polymerization of Styrene in the Presence of Graphene G2

5 g of graphene G2, previously treated with sulfuric acid at 96% as described in Example 8, are suspended in 97.5 g of ethylbenzene in a glass jacketed reactor heated with an oil flow, equipped with a mechanical stirrer, thermometer and drip funnel.

The same procedure is adopted as described in Examples 9-12, dripping 97.5 g of styrene.

Figure 5:
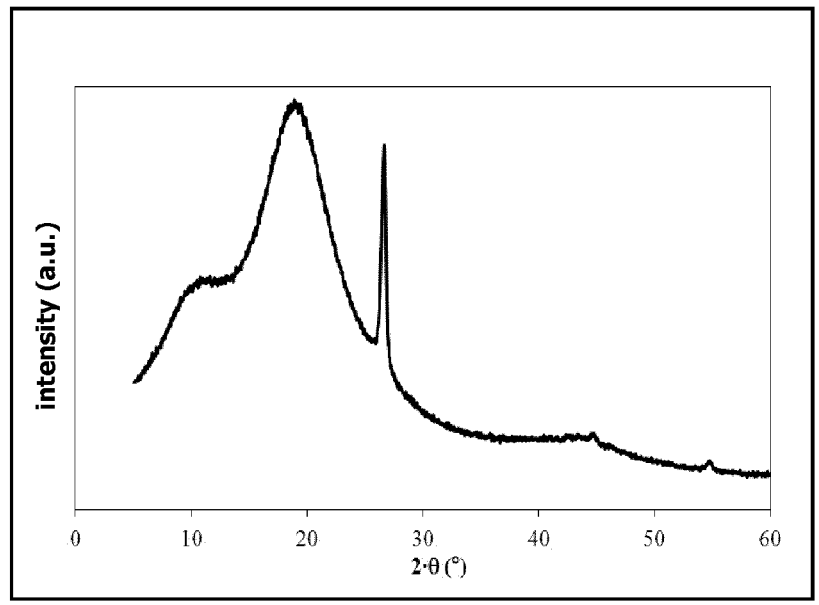
FIG. 5 is the XRD diffractogram of the polymer obtained with the method described in comparative Example 2.
Figure 6:
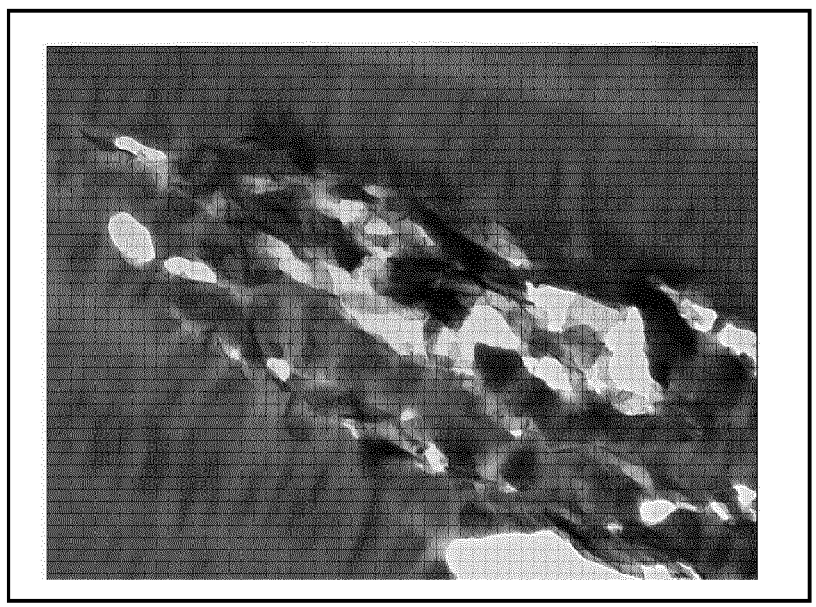
FIG. 6 is the TEM micrography at 1 µm of the polymer obtained with the method described in comparative Example 2.

FIGS. 5 and 6 respectively show the XRD diffractogram and a TEM micrograph at a resolution of 1 μm of the polymer obtained, having a molecular weight ranging from 500 to 1,000 Daltons.

Examples 13 and 14

Cationic Polymerization in a Single Step between Styrene and the Vinyl Monomer in the Presence of Graphite Oxide Impregnated with Sulfuric Acid Adsorption of sulfuric acid on graphite oxide.

1.0 g of graphite oxide GRAFOX 2, prepared in Example 2, are suspended in a 100 ml single-necked flask, in 30 ml of tetrahydrofuran and 2 ml of 96% sulphuric acid are added.

The mixture is subjected to mechanical stirring for one hour and the solvent is then removed by heating under vacuum.

Polymerization 1 g of graphite oxide impregnated with sulfuric acid in 100 g of ethylbenzene, are subjected to ultrasounds in a 250 ml single-necked flask, for three hours (with the apparatus described in Examples 4-7).

The suspension is transferred to a glass jacketed reactor heated with an oil flow, equipped with a mechanical stirrer, thermometer and drip funnel.

1.75 g of maleic anhydride are added and the suspension is heated under stirring.

When the temperature reaches 35° C., 34 g of styrene are added very slowly dropwise.

The suspension is heated slowly and the dripping of styrene is continued up to a temperature of 55° C.

The polymer is removed from the reactor and the solvent and possible residual monomer are removed by heating the polymer under vacuum to 230° C. for 30 minutes.

The polymers indicated in Table 4 are obtained.

Figure 7:
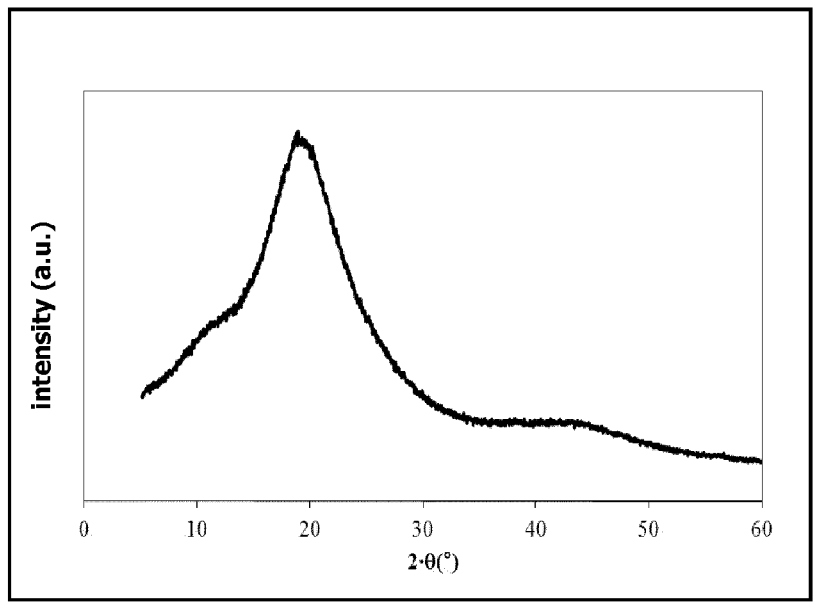
FIG. 7 is the XRD diffractogram of a polymer obtained with the method described in Example 13.
Figure 8:
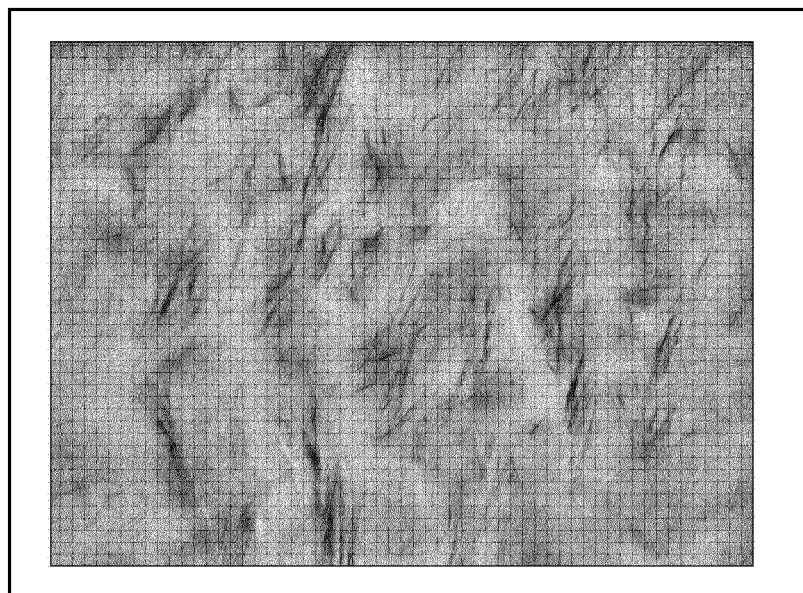
FIG. 8 is the TEM micrography at 200 nm of the polymer obtained with the method described in Example 13.

FIGS. 7 and 8 respectively show the XRD diffractogram and a TEM micrograph at a resolution of 200 nm of the polymer P-SMAH-GRAFOX2-MIX-CAT, prepared in Example 13, having a molecular weight ranging from 550 to 1,000 Daltons.

TABLE 4

|  | Example 13 | Example 14 |
|---|---|---|
| Name of product | P-SMAH-GRAFOX2-MIX-CAT | P-SMETAC-GRAFOX2-MIX-CAT |
| Graphite oxide | GRAFOX 2 | GRAFOX 2 |
|  | 1.00 g | 1.00 g |
| Ethylbenzene (g) | 100 | 100 |
| Maleic anhydride (g) | 1.75 | / |
| Methacrylic acid (g) | / | 2.82 |
| Styrene (g) | 34 | 34 |

Comparative Example 3

Radical Polymerization in a Single Step between Styrene and Maleic Anhydride in the Presence of Graphite Oxide 127.5 g of styrene, 22.5 g of ethylbenzene, and 1 g of graphite oxide GRAFOX 2, prepared in Example 2, are introduced into a 200 ml flask.

The mixture is subjected to ultrasounds for three hours (with the apparatus described in Examples 4-7), cooling the bath.

The suspension is transferred to a jacketed reactor (heated with an oil flow, equipped with a mechanical stirrer and thermometer) and 1.75 g of maleic anhydride are introduced.

The mixture is slowly heated up to 130° C. and is left at this temperature under stirring until the reaction produces about 20% of solids.

The polymer is devolatilized by heating under vacuum to 230° C. for 30 minutes.

Figure 9:
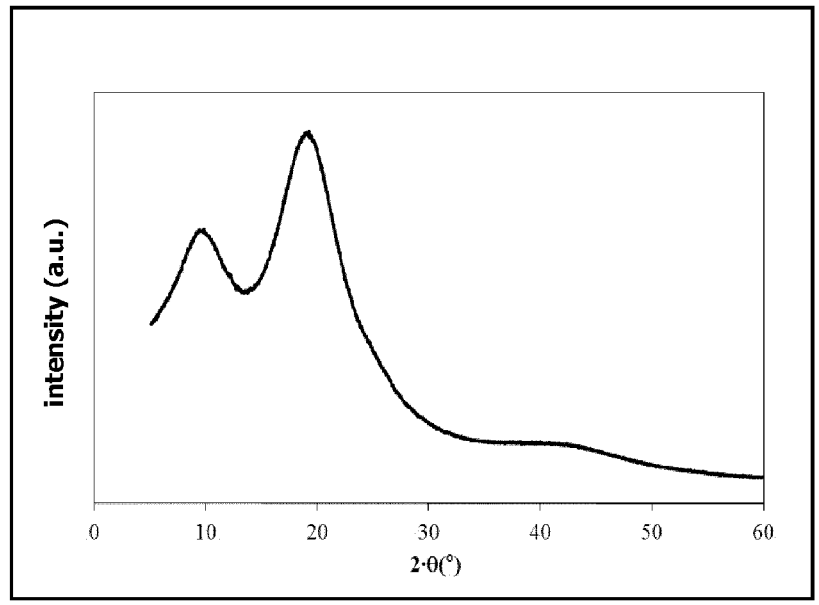
FIG. 9 is the XRD diffractogram of the polymer obtained with the method described in comparative Example 3.
Figure 10:
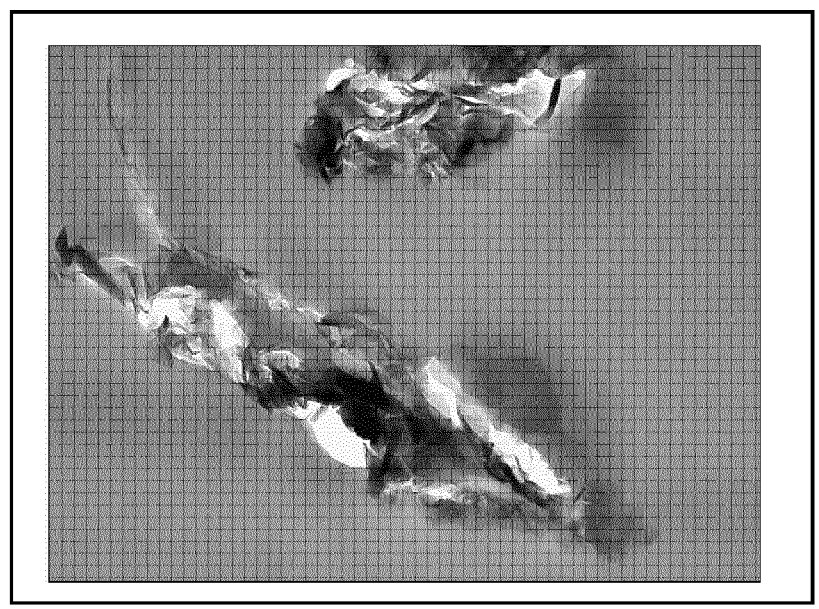
FIG. 10 is the TEM micrography at 1 µm of the polymer obtained with the method described in comparative Example 3.

FIGS. 9 and 10 respectively show the XRD diffractogram and a TEM micrograph at a resolution of 1 μm of the polymer obtained, having a molecular weight equal to about 300,000 Daltons.

TABLE 5

| characteristics of the graphite UF2 (Graphit Kropfmühl) | |
| --- | --- |
| Coal content (%) | min 99.5 |
| Ashes (%) | <0.5 |
| Humidity (%) | <0.2 |
| Specific surface area (DIN 66131, m²/g) | 15 |
| Apparent Density (DIN EN ISO 60, g/l) | 200 |
| Si (ppm) | 750 |
| laser diffraction d10 (μ) | 2.1 |
| laser diffraction d50 (μ) | 4.5 |
| laser diffraction d90 (μ) | 8.3 |
| Al (ppm) | 250 |
| Fe (ppm) | 400 |
| Ca (ppm) | 150 |
| Mg (ppm) | 200 |

TABLE 6

| characteristics of graphene G2 (Cheap Tubes). | |
| --- | --- |
| Diameter (μm) | 5 |
| Average thickness (nm) | 10 |
| Purity (%) | >97 |
| Surface area (m²/g) | 100 |

The invention claimed is:

1. A cationic polymerization process for the synthesis of nano-structured polymers containing graphene which comprises reacting graphite oxide dispersed in a solvent by means of ultrasounds, with at least one vinyl monomer and at least one vinyl aromatic monomer, in the presence of at least one strong inorganic acid suitable for activating a cationic polymerization, wherein:
said graphite oxide contains from 5% to 60% by weight of bound oxygen,
said vinyl monomer contains at least one carboxylic group wherein the ratio between oxygen bound to the oxide and carboxylic groups ranges from 1:10 to 10:1 in moles per mole, and
the ratio between said vinyl aromatic monomer and the sum of the quantity of graphite oxide and vinyl monomer containing carboxylic groups ranges from 50% to 99% by weight.

2. The process according to claim 1, wherein the graphite oxide is dispersed in a solvent by means of ultrasounds together with at least one inorganic acid and at least one vinyl monomer containing carboxylic groups, said dispersion is then concentrated by totally or partially evaporating the solvent, and at least one vinyl aromatic monomer is subsequently added to allow the cationic polymerization to take place.

3. The process according to claim 1, wherein the graphite oxide is dispersed in a solvent, by means of ultrasounds, at least one inorganic acid is then added, said dispersion is subsequently concentrated by totally or partially evaporating the solvent, and, after concentration, the vinyl monomer containing carboxylic groups and the vinyl aromatic monomer are subsequently added to allow the cationic polymerization to take place.

4. The process according to claim 1, wherein the graphite oxide contains from 15% to 50% by weight of bound oxygen.

5. The process according to claim 4, wherein the graphite oxide contains from 20% to 30% by weight of bound oxygen.

6. The process according to claim 1, wherein the vinyl aromatic monomer is selected from those having general formula (I):

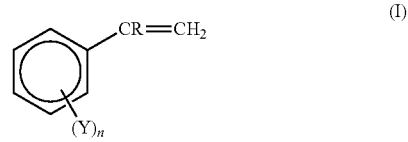

wherein
R is a hydrogen or a methyl group,
n is zero or an integer ranging from 1 to 5,
Y is a halogen, a saturated or unsaturated alkyl radical or an alkoxyl radical having from 1 to 4 carbon atoms.

7. The process according to claim 1, wherein the vinyl monomer is selected from derivatives of acrylic and methacrylic acids.

8. The process according to claim 1, wherein the solvent is selected from solvents used for the esterification reaction of carboxylic acids, or derivatives thereof, with alcohols.

9. The process according to claim 8, wherein the solvent is selected from tetrahydrofuran, dioxane, dimethyl sulfoxide, ethylbenzene, toluene, xylene or propylbenzene.

10. The process according to claim 1, wherein the strong inorganic acid, pure or in aqueous solution, is selected from sulfuric acid, nitric acid, hydrogen halide acid, ortho-phosphoric acid.

11. The process according to claim 1, wherein a temperature of the dispersion of graphite oxide in the solvent by means of ultrasounds ranges from 50° C. to 100° C.

12. The process according to claim 1, wherein a temperature of the dispersion of graphite oxide in the solvent by means of ultrasounds ranges from 0° C. to 80° C.

13. The process according to claim 1, wherein a frequency of the ultrasounds ranges from 20 to 1,000 Mhz.

14. The process according to claim 12, wherein a frequency of the ultrasounds ranges from 20 to 200 khz.

15. The process according to claim 1, wherein an application time of the ultrasounds ranges from 1 minute to 1 month.

16. The process according to claim 15, wherein the application time of the ultrasounds ranges from 10 minutes to one day.

17. The process according to claim 1, wherein the vinyl aromatic monomers are selected from styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, divinylbenzene.

18. The process according to claim 1, wherein the vinyl monomers are selected from maleic anhydride, maleic acid chloride, maleic acid esters deriving from alcohols having from 1 to 8 carbon atoms, acrylic acid, acrylic acid chloride, acrylic acid anhydrides, acrylic acid esters deriving from alcohols having from 1 to 8 carbon atoms, methacrylic acid, methacrylic acid chloride, methacrylic acid anhydrides, methacrylic acid esters deriving from alcohols having from 1 to 8 carbon atoms.

* * * * *